United States Patent [19]

Patz et al.

[11] 4,381,734
[45] May 3, 1983

[54] LIVESTOCK FEED CONVEYOR INCLUDING BELT RETAINER

[75] Inventors: Paul Patz; Howard G. Patz, both of Pound; Russell W. Cleven, Marinette; James M. Hackbarth, Suring, all of Wis.

[73] Assignee: Patz Company, Pound, Wis.

[21] Appl. No.: 327,129

[22] Filed: Dec. 3, 1981

[51] Int. Cl.³ .................... A01K 5/02; B65G 47/00
[52] U.S. Cl. ............................. 119/52 B; 198/364
[58] Field of Search ............ 119/52 B, 56 R, 52 AF; 198/364

[56] References Cited

U.S. PATENT DOCUMENTS

| 3,153,477 | 10/1964 | Tipton | 198/364 |
| 3,306,261 | 2/1967 | Purdy | 119/56 R |
| 3,672,334 | 6/1972 | Scheppele | 119/52 B |
| 4,320,825 | 3/1982 | Buschbom et al. | 198/364 |

Primary Examiner—Hugh R. Chamblee

[57] ABSTRACT

Apparatus for depositing cattle feed in an elongated bin in an evenly distributed relation including a conveyor belt having a surface for supporting feed, a hopper for depositing feed on the supporting surface of the belt, and a plow including a plow face positioned adjacent the supporting surface of the conveyor belt and adapted to sweep feed off of the conveyor belt into the feed bin. A restraining member is carried by the plow and engages an edge of the conveyor belt for supporting the belt in position and preventing it from moving laterally.

6 Claims, 4 Drawing Figures

LIVESTOCK FEED CONVEYOR INCLUDING BELT RETAINER

FIELD OF THE INVENTION

The invention relates to livestock feeders or feed conveyors and to such feeders including an elongated conveyor belt adapted to distribute feed along the length of an elongated feed bin and more particularly to a means for maintaining the conveyor belt on its supporting frame.

BACKGROUND OF THE INVENTION

Dairy and beef feed-lots have been automated by employing mechanical means for distributing cattle feed or livestock feed along the length of an elongated feed trough or bunk feeder. Such mechanical means have included a conveyor belt positioned above the bunk feeder with a feed hopper positioned above one end of the conveyor belt. The feed is dropped onto the conveyor belt as the conveyor belt passes beneath the hopper. The conveyor belt moves the feed along the length of the bunk feeder, and a plow is provided and moves back and forth along the length of the conveyor belt and plows the feed off of the conveyor belt into the bunk feeder below.

An example of one such automatic livestock feeding system is produced by Lancaster Silo Company, Lancaster, Penna.

One of the problems associated with such feeders including an elongated conveyor belt is that the contact of the plow with the conveyor belt, for use in pushing the feed off of the conveyor belt, tends to apply a lateral force on the conveyor belt tending to cause the belt to move laterally with respect to the frame supporting the conveyor belt. The belt can then become misaligned with respect to the supporting frame thereby causing undue wear of the belt or causing the belt to move off of the frame.

SUMMARY OF THE INVENTION

The invention includes a feeder for depositing cattle feed in an elongated feed bin in an evenly distributed relation and including a frame positioned above the feed bin and extending along its length, the frame including an elongated supporting surface having opposite edges and including a vertical wall extending upwardly from one of the edges, and a conveyor belt supported on the supporting surface and for supporting feed. The conveyor belt includes opposite edges, one of the edges positioned adjacent the wall of the frame. Means are also provided for continuously driving the conveyor belt, and for depositing feed on the supporting surface of the belt. A plow including a plow blade is positioned adjacent the supporting surface of the conveyor belt and is adapted to sweep feed off of the conveyor belt into the elongated feed bin, and means are provided for causing reciprocating movement of the plow along the length of the conveyor. Means are also provided for securing the plow to the frame for reciprocating movement along the frame. Means are further provided for restraining the conveyor belt on the frame, the means for restraining including a restraining member carried by the plow and engaging the other edge of the belt.

In one embodiment of the invention the means for restraining includes a foot positionable beneath the edge of the belt, and means for connecting the foot to the plow.

Various other features and advantages of the invention will be apparent by reference to the following description of a preferred embodiment, from the claims and from the drawings.

Figure 1:
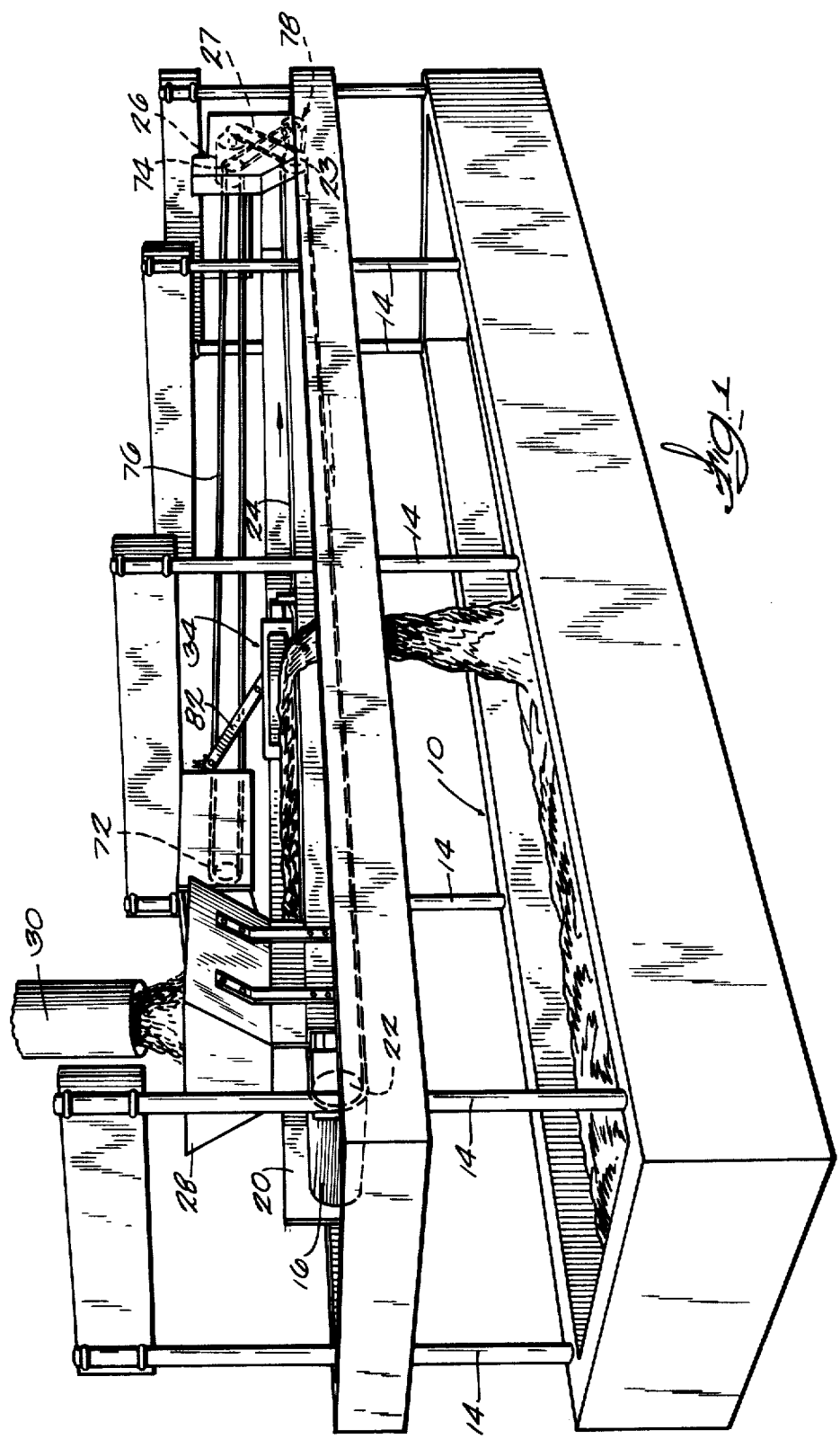
FIG. 1 is a perspective view of apparatus embodying the invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a feeder embodying the present invention and including apparatus for depositing forage and other cattle feed into an elongated feed bin 10 in an evenly distributed pattern along the length of the feed bin 10. The feeder includes a frame supported by a plurality of legs 14 and adapted to support an elongated conveyor belt 16, the conveyor belt 16 being supported above the feed bin and extending along substantially the entire length of the feed bin.

Figure 2:
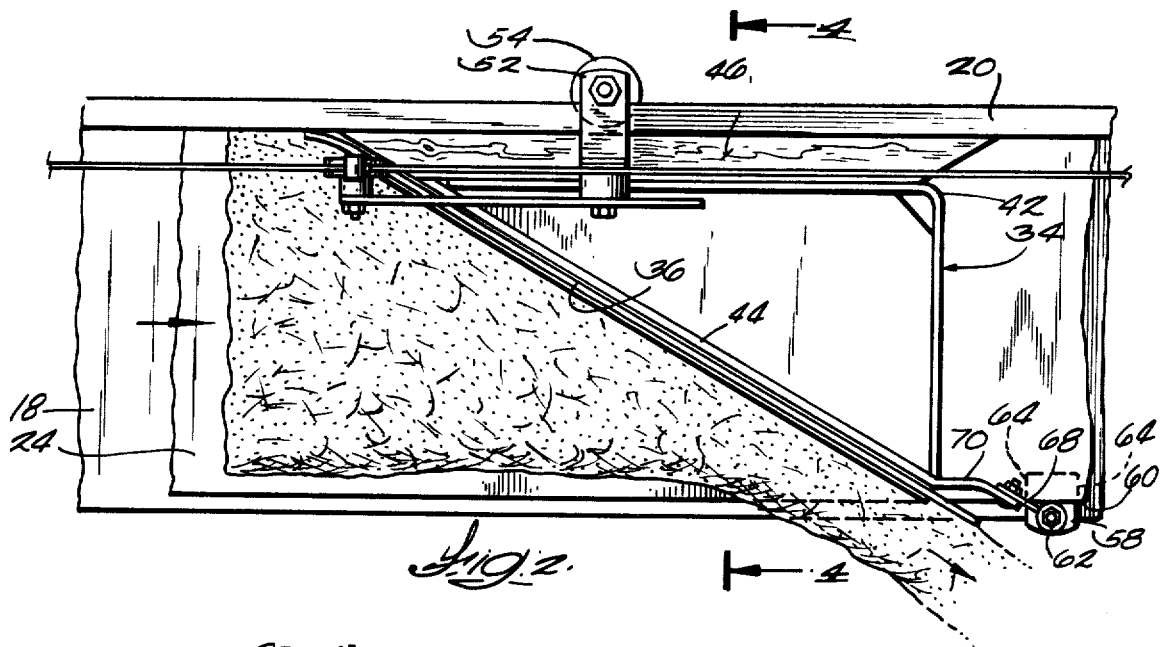
FIG. 2 is a plan view of a portion of the apparatus shown in FIG. 1.

Referring more particularly to the means for supporting the conveyor belt 16, the frame includes an elongated planar horizontal plate 18 (FIG. 2) adapted to support the upper flight of the conveyor belt 16. A vertical side wall 20 extends upwardly from one side to the elongated plate 18 and extends along the entire length of the conveyor. Also included are a pair of drive rollers 22 and 23 supported at opposite ends of the feeder. The upper belt flight 24 of the conveyor belt 16 is supported on the upper planar horizontal surface of the plate 18, extends around and over the drive roller 23, under the elongated plate 18, and around the roller 22 at the opposite end of the feeder.

Means are also provided for continuously driving the conveyor belt 16. While various means could be provided for driving the belt, in the illustrated arrangement an electric motor 26 is mounted at one end of the feeder and is drivingly connected by means of a chain and sprocket assembly 27 to the drive roller 23.

Means are further provided for depositing fodder or cattle feed onto the moving conveyor belt 16, whereby the fodder or feed is carried along the length of the conveyor belt. The means for depositing includes a funnel shaped hopper 28 for containing a quantity of feed which can be supplied by conventional feed handling equipment such as a feed conduit 30. The hopper 28 includes an opening in its bottom for depositing feed onto the moving conveyor belt, the feed being fed through the hopper 28 by gravity.

In operation of the conveyor belt 16, the feed falls from the hopper 28 onto the conveyor belt 16 as the conveyor belt moves beneath the hopper, and the feed is thus conveyed along the length of the feed bin 10 on the conveyor belt.

Figure 3:
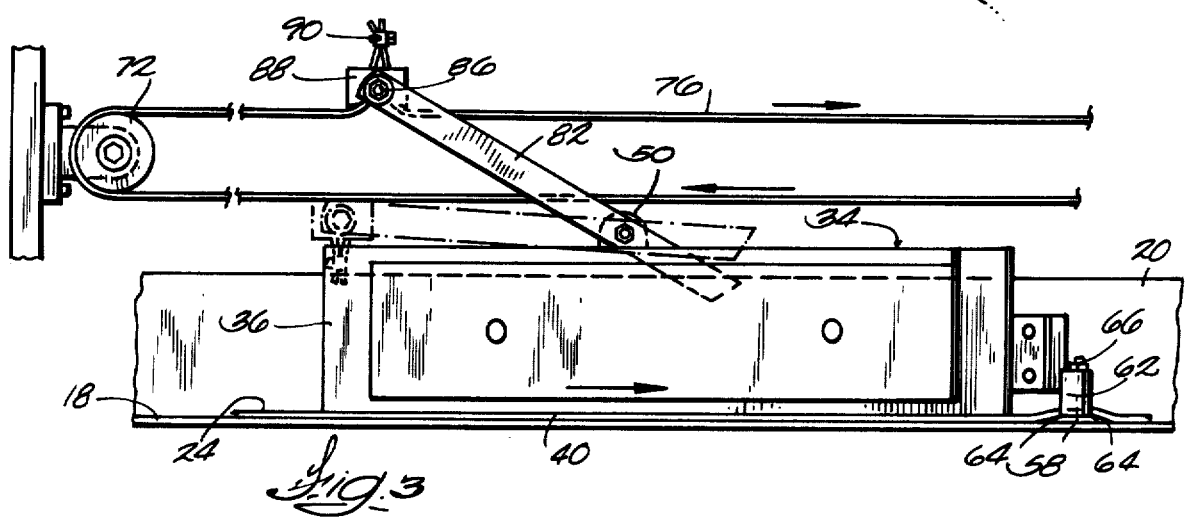
FIG. 3 is a side elevation view of the apparatus shown in FIG. 2.

Means are further provided for plowing the feed off of the conveyor belt 16 and into the feed bin 10 and in such a manner as to evenly distribute the feed along the length of the feed bin. The means for plowing the feed off of the conveyor belt 16 includes a plow 34 having a blade 36 (FIGS. 2 and 3) adapted to move along the length of the upper flight 24 of the conveyor belt 16 and to push the feed laterally off of the conveyor belt into the feed bin 10 below. The plow 34 is adapted to move from the hopper 28 in the direction of movement of the upper flight 24 until the plow 34 reaches the opposite end of the feeder. During this time the hopper 28 continually deposits feed on the conveyor belt as the belt moves beneath the hopper. When the plow 34 reaches the opposite end of the feeder its direction reverses and it moves along the length of the conveyor belt in the direction opposite to the direction of movement of the belt. The upper belt flight 24 moves at a speed approximately 4 or 5 times that of the plow 34 as the plow travels away from the hopper 28. The plow is shaped such that, as the conveyor belt 16 moves beneath the plow blade 36, the plow blade will push the feed off of the conveyor belt into the feed bin 10.

Figure 4:
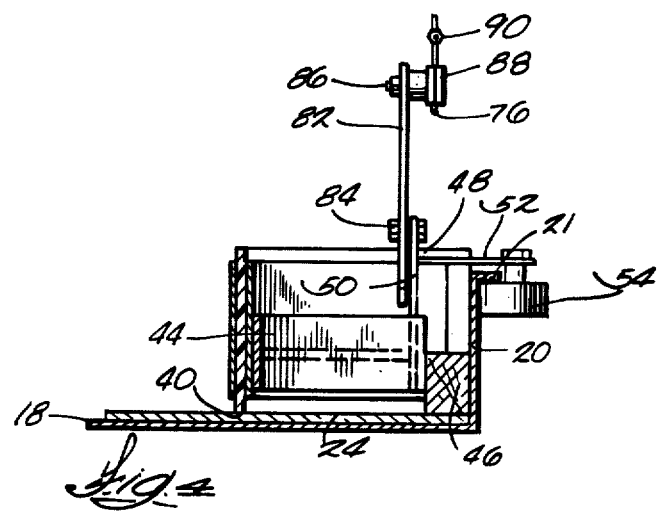
FIG. 4 is a cross section view taken along line 4—4 in FIG. 2.

Referring more particularly to the construction of the plow 34, the plow blade 36 defines a vertical plane positioned at an angle of approximately 30° with respect to the direction of movement of the conveyor belt. The plow blade 36 includes a linear lower edge 40 (FIGS. 3 and 4) adapted to be positioned against the upper surface of the belt flight 24 such that as the belt 16 moves under the plow blade 36, the blade will force the feed supported on the belt laterally into the feed bin 10. The plow blade 36 is supported by a frame which is triangular when viewed in plan, the frame including an L-shaped frame member 42 and a vertically oriented plate 44 welded to the L-shaped member and so as to form the hypotenuse of the triangular frame. The plow blade 36 is bolted to the plate 44 in back-to-back relation. The plow 34 also includes a side board 46 which is bolted to the lower edge of the frame member 42 and is adapted to ride against a lower portion of the vertical wall 20 and on a portion of the belt flight 24 adjacent the vertical wall 20. In a preferred form of the invention the side board 20 is comprised of wood and is intended to support the blade 36 for free slidable movement against the vertical sidewall 20 and to prevent wear of the side wall 20 and the plow as well as to prevent undue wear of the belt 16.

Means are also provided for holding the plow 34 against the vertical sidewall 20 of the frame and for holding the plow 34 down against the belt 16. While various means could be provided for securing the plow in position, in the illustrated arrangement a bracket 48 (FIGS. 3 and 4) including a vertical member 50 extends upwardly from the frame 42. The bracket 48 also includes a horizontal member 52 welded to an upper end of the vertical member 50 and extending over the upper edge of the vertical sidewall 20 of the frame. The free end of the horizontal member 52 supports a freely rotatable wheel 54, the wheel 54 being rotatable about a vertical axis and being adapted to engage and roll along the outside surface of the side wall 20 of the conveyor frame. The upper edge of the wall 20 includes a lip 21 and the roller 54 includes a portion extending under the lip 21 such that the roller 54 is restrained against upward movement. The arrangement of the roller 54 and the lip 21 secures the plow against the sidewall 20 and also prevents upward movement of the plow 34.

In operation of the apparatus described above, the plow 34 generates a lateral force on the upper flight 24 of the conveyor belt 16, tending to push the belt in the same direction as the fodder is pushed. More specifically, since the plow blade 36 is positioned at an angle of approximately 30° with respect to the direction of relative movement of the plow blade 36 over the surface of the belt, the friction of the plow blade 36 against the surface of the belt 16 causes a lateral force on the belt tending to cause the belt to move laterally off of the supporting surface provided by the elongated plate 18.

To prevent such movement of the belt, means are provided for restraining the conveyor belt 16 and for keeping it on the supporting surface. This means includes a shoe 58 having a portion adapted to be positioned beneath the edge 60 of the belt, a member 62 adapted to support the shoe 58 and to be positioned against the edge 60 of the conveyor belt to prevent lateral movement of the belt, and a means for fixedly attaching the member 62 to the plow 34. More particularly, the shoe 58 comprises a flat plate having edges 64 extending transversely to the edges of the belt. The upper surfaces of the edges 64 are beveled so as to permit the belt to easily slide up and over the shoe 58 to thereby reduce the wear of the belt. While the member 62 could have various constructions, in the illustrated arrangement, the member 62 supporting the shoe 58 comprises a cylindrical member having a central axially extending bore, the member 62 being positioned such that the bore is vertical. A machine screw 66 extends upwardly through the shoe and through the central bore of the cylindrical member 62 to thereby secure the shoe 58 in place. Since the inwardly extending end of the shoe 58 projects under the edge of the upper belt flight 20, and the shoe is fixed to the bottom of the member 62, the belt is not permitted to slide under the member 62 and off of the supporting surface.

While various means could be provided for securing the cylindrical member 62 to the plow 34, in the illustrated construction a plate 68 is welded to the cylindrical member 62 and is bolted to a projecting end 70 of the frame member 44.

Means are also provided for causing reciprocating movement of the plow 34 back and forth along the length of the upper flight 24 of the conveyor belt 16. The means for causing such reciprocating movement of the plow 34 includes a pair of pulleys 72 and 74 positioned at opposite ends of the conveyor frame and an elongated flexible member 76 extending around the pulleys 72 and 74. In a preferred form of the invention, the elongated flexible member 76 is a steel cable impregnated with rubber and having a rubber covering.

Means are also provided for driving the cable 76. While various means could be provided, in the illustrated arrangement the pulley 74 is drivingly connected to the conveyor belt drive assembly 27 by means of a belt and pulley assembly 78. In a preferred form of the invention the belt and pulley assembly have a drive ratio causing the steel cable 76 to be driven at a speed approximately one-fifth that of the conveyor belt 16.

Means are also provided for connecting the drive cable 76 to the plow 34. In the illustrated construction the means for connecting includes a rigid arm 82 pivotably joined to the plow 34. More particularly, a lower end of the rigid arm 82 is pivotally joined to the vertically extending member 50 by a bolt 84 in such a manner as to permit the arm 82 to be pivotable about a horizontal axis perpendicular to the direction of movement of the plow 34.

The means for connecting the plow 34 to the cable 76 also includes a means for pivotally joining an upper end of the rigid arm 82 to the cable 76, this means for connecting also providing means for clamping the opposite ends of the cable 76 together. Referring more particularly to the means for connecting the plow to the cable, the upper end of the rigid arm 82 adapted to connect the cable 76 to the plow 34 includes a bore, and a bolt 86 extends through the bore to pivotably join the upper end of the arm 82 to a clamp assembly 88. The clamp assembly 88 is comprised of a pair of plates which house the opposite ends of the cable 76, and a clamp 90 is provided to clamp these ends together.

In operation of the apparatus, when the plow is moving away from the hopper and in the direction of movement of the upper flight 24 of the conveyor belt, the frictional engagement of the lower edge 40 of the plow blade 36 with the upper flight 24 tends to cause the plow 34 to be pulled along with the conveyor belt. Since the cable 76 is moving at a speed of only one-fifth that of the upper flight 24 of the conveyor belt 16, the cable 76 and the rigid arm 82 restrain the plow 34. When the plow 34 reaches the end of its travel, the clamp assembly 88 will pass around the circumference of the pulley 74 and the clamp assembly 88 and the arm 82 will assume the position shown in phantom in FIG. 3 as the cable 76 then pulls the plow 34 in a direction opposite to the direction of movement of the belt flight 24 and toward the pulley 72. When the clamp assembly 88 reaches pulley 72 it will pass around the circumference of that pulley and once again assume the solid line position shown in FIG. 3.

Various features of the invention are set forth in the following claims.

We claim:

1. Apparatus for depositing cattle feed in an elongated bin in an evenly distributed relation, the apparatus for depositing feed including
   a frame including an elongated horizontal surface having opposite edges and a vertical wall extending upwardly from one of said edges and extending along the length of said one of said edges,
   a conveyor belt supported on said elongated horizontal surface and having a surface for supporting feed, said conveyor belt including opposite edges, one of said edges being positioned adjacent the other of said edges of said elongated horizontal surface,
   means for continuously driving said conveyor belt,
   means for depositing feed on said surface of said belt,
   a plow including a plow face positioned adjacent said supporting surface of said conveyor belt and adapted to sweep feed over said edge of said conveyor belt into said elongated bin, said plow including a leading portion and a trailing portion,
   means for causing reciprocating movement of said plow along the length of said horizontal surface,
   means for securing said plow to said frame as said plow moves reciprocably back and forth along the length of said frame, said means for securing said plow to said frame including a member connected to said plow and extending over said upper edge and,
   means for restraining said belt on said frame, said means for restraining including a restraining member carried by said plow and engaging said one of said edges of said belt, said restraining member including a foot positionable beneath said one of said edges of said belt, and means for connecting said foot to said trailing portion of said plow.

2. An apparatus as set forth in claim 1 wherein said restraining member includes a cylindrical member having a generally vertical longitudinal axis and upper and lower ends, said cylindrical member being adapted to engage the edge of said conveyor belt, and wherein said foot is secured to said lower end of said cylindrical member, said foot including a portion adapted to extend under said other edge of said conveyor belt.

3. Apparatus for depositing cattle feed in an elongated bin in an evenly distributed relation, the apparatus for depositing feed including
   a frame including an elongated horizontal surface having opposite edges and including a vertical wall extending upwardly from the other of said edges of said supporting surface, said vertical wall including an upper edge, said upper edge including a lip extending away from said plow, and said vertical wall including one side facing said surface and an opposite side,
   a conveyor belt supported on said elongated horizontal surface and having a surface for supporting feed, said conveyor belt including opposite edges, one of said edges being positioned adjacent an edge of said elongated supporting surface,
   means for continuously driving the conveyor belt,
   means for depositing feed on said surface of said belt,
   a plow including a plow face positioned adjacent said supporting surface of said conveyor belt and adapted to sweep feed over said edge of said conveyor belt into said elongated bin,
   means for causing reciprocating movement of said plow along the length of said conveyor,
   means for securing said plow to said frame for reciprocating movement along said frame, said means for securing said plow to said frame including a roller rotatable about a vertical axis and means for supporting said roller for rotation along the length of said opposite side of said wall, and with a portion of said roller extending under said lip, said means for supporting including means for connecting said roller to said plow and
   means for restraining said belt on said frame, said means for restraining including a restraining member carried by said plow and engaging said one of said edges of said belt.

4. An apparatus as set forth in claim 3 wherein said means for restraining includes a foot positionable beneath said one of said edges of said belt, and means for connecting said foot to said plow.

5. An apparatus as set forth in claim 3 wherein said plow includes a blade defining a generally vertical plane, said blade extending across said belt and at an obtuse angle to the direction of movement of said belt, and wherein said blade includes a portion adjacent said one of said edges of said conveyor belt, and said restraining means is fixed to said portion of said blade.

6. An apparatus as set forth in claim 3 wherein said restraining member includes a cylindrical member having a generally vertical longitudinal axis and upper and lower ends, said cylindrical member being adapted to engage the edge of said conveyor belt, a planar foot member secured to said lower end of said cylindrical member, said planar foot member including a portion adapted to extend under said other edge of said conveyor belt, and means for fixing said cylindrical member to said plow.

* * * * *